United States Patent [19]
Campbell

[11] 3,805,958
[45] Apr. 23, 1974

[54] FILTER CARTRIDGE AND AIR DOME CONSTRUCTIONS

[75] Inventor: Rhody R. Campbell, Fairfield, Ill.

[73] Assignee: Airtex Products, Division of United Industrial Syndicate, New York, N.Y.

[22] Filed: May 4, 1972

[21] Appl. No.: 250,366

[52] U.S. Cl.................. 210/136, 210/349, 210/443
[51] Int. Cl............................................. B01d 29/04
[58] Field of Search .......... 210/136, 194, 349, 416, 210/437, 443

[56] References Cited
UNITED STATES PATENTS

| | | | |
|---|---|---|---|
| 3,409,135 | 11/1968 | Bradley et al...................... | 210/136 |
| 3,254,769 | 6/1966 | McArthur........................... | 210/194 |
| 3,071,251 | 1/1963 | Szwargulski ....................... | 210/349 |
| 3,236,383 | 2/1966 | Smith et al.......................... | 210/136 |
| 2,537,241 | 1/1951 | Smith.............................. | 210/136 X |

Primary Examiner—John Adee
Assistant Examiner—Robert H. Spitzer
Attorney, Agent, or Firm—Zalkind, Horne & Shuster

[57] ABSTRACT

A unitary replaceable device combining a fuel filter and air dome for vehicle fuel pumps is provided. The units employ cylindrical mesh or screen filters having molded skeletonized supporting frameworks for the filter screens, including means for securing air domes within the filters. Each filter air dome unit is readily secured in inlet and outlet pump body formations and can be removed for replacement or for cleansing.

11 Claims, 10 Drawing Figures

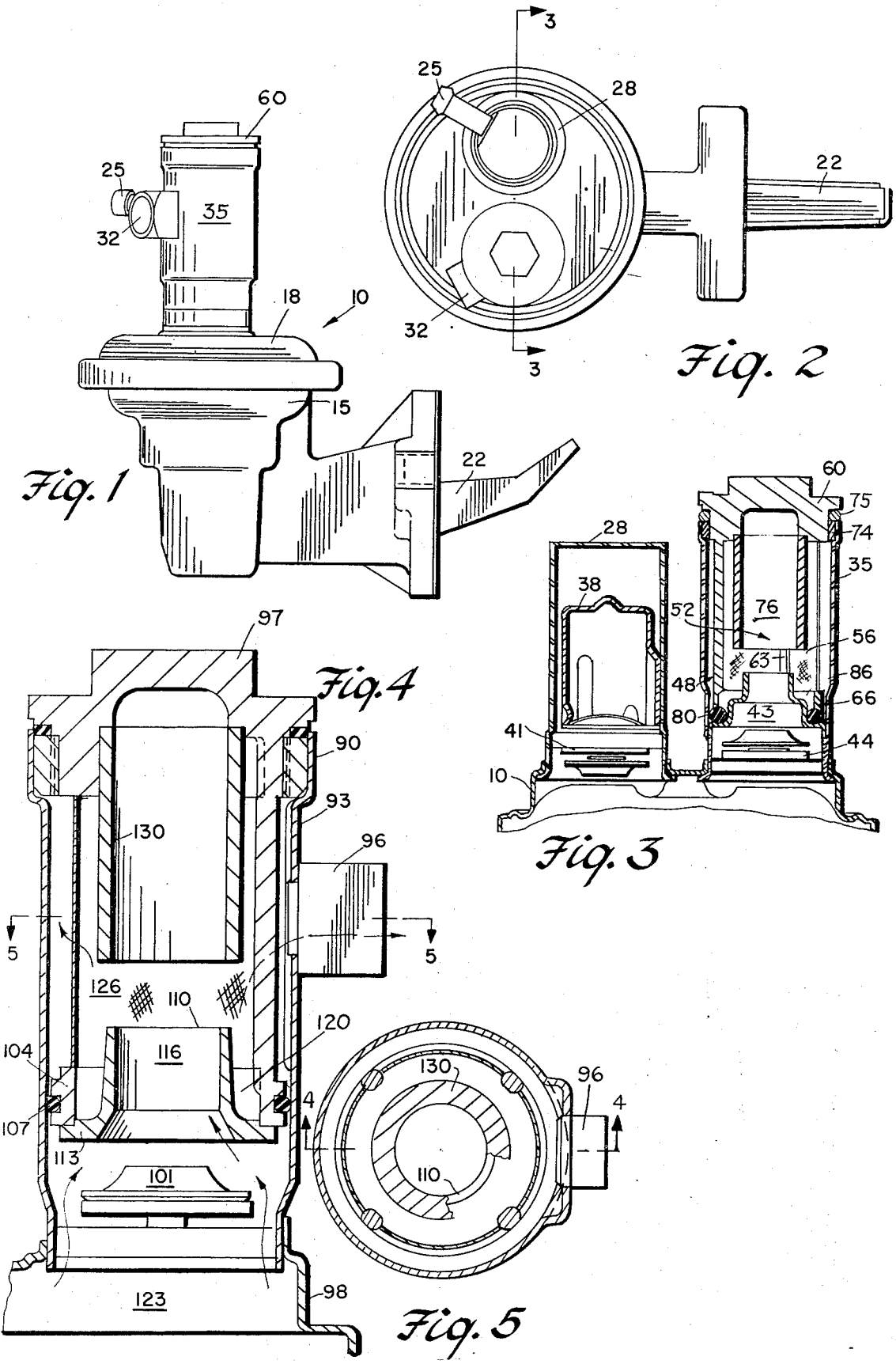

FILTER CARTRIDGE AND AIR DOME CONSTRUCTIONS

Briefly, the invention comprises a unit which may be either disposable or readily cleanable and having as a filter member a cylindrical mesh screen secured by being integrally molded in a skeletonized frame one end of which is a cap that can be secured within the so-called tower of a fuel pump. Such towers may be cast or sheet metal generally cylindrical formations which effect inlet or outlet passages to the pump and which have an inlet or an outlet valve at one end, at the point of connection with the pump body fuel section.

Pumps which are designed with towers of the kind described may be mounted so that the fuel section is at the bottom or at the top of the pump body, depending upon the type of engine for which any particular pump is to be used.

Although the general construction of the cylindrical screen filter member herein disclosed is not new, a feature has been added for a simplified construction as composed with the prior art, wherein an air dome is furnished within the confines of the screen by being secured to the cap. Further, such air dome may be a simple plastic sleeve or collar cemented within the cap so as to be closed at one end thereby. Still further, the flow fitting for the tower is in the side of the tower and therefore not a costly throw away item with the filter cartridge.

Various modifications and constructions of the invention are disclosed herein showing mode of incorporation in pump towers and including sediment traps.

A detailed description of the invention now follows in combination with the appended drawings in which:

FIG. 1 is an external side view of a complete pump;

FIG. 2 is a plan view;

FIG. 3 is a fragmentary cross section in elevation of the towers of FIG. 1 taken generally on the line 3—3 of FIG. 2;

FIG. 4 is a magnified version in cross section of an outlet tower;

FIG. 5 is a section taken generally on the line 5—5 of FIG. 4;

Figure 7:
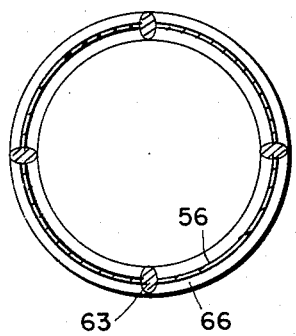
FIG. 7 is a section taken generally in the line 7—7 of FIG. 6.

Referring now to FIG. 1, the basic components of the pump comprise of a pump body 10 having a lever section 15 and a fuel section 18. It will be understood that the construction is well known, the lever section pivotally mounting an actuating lever 22 for actuating the pump diaphragm (not shown) whence fuel is drawn in through an inlet fitting 25 secured to inlet tower 28, the fuel being discharged through the outlet fitting 32 secured to outlet tower 35 at the side of the tower. Both towers may be sheet metal sleeves and the outlet tower is open ended at its outer end to be subsequently closed and sealed as later described.

Both pump sections may be cast or sheet metal, or, as in the present instance, the fuel section 10 is sheet metal while the lever section 15 is cast. As seen in FIG. 3, the towers 28 and 35 are secured at their lower ends as by welding or brazing to suitably provided apertures at the top of section 10 and any conventional construction and mode of assembly may be utilized for this purpose. In this modification, a tubular coupling 43 is utilized, later described, intermediate section 10 and the outlet tower. The inlet tower 28 is not provided with a filter in this instance but has an air dome 38 of the kind disclosed in Hicks Pat. No. 3,224,377, and is further provided at its lower end with an inlet valve 41 of conventional construction.

The outlet tower 35 has an outlet valve 44 within coupling 43 which attaches the tower to the fuel section. The assembly may be made by welding or brazing or in any other suitable manner.

The invention herein comprises the cartridge per se of the filter member 48 in unitary assembly with an air dome 52 inserted into the tower. The filter member and air dome being open ended at their tower ends.

Figure 6:
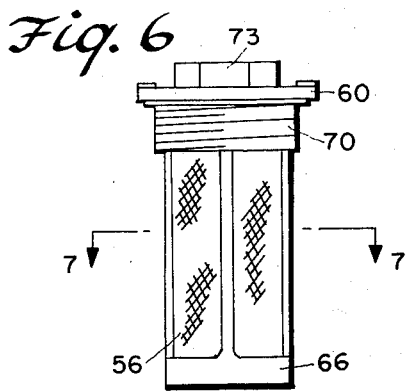
FIG. 6 is an external elevation showing the general construction of the type of filter member used in pumps of the invention.

The general construction of filter members of the type used in the invention is shown in FIGS. 6 and 7 and such constructions have heretofore been used for various industrial purposes. Thus, referring to FIGS. 3, 6 and 7, the filter member comprises a mesh screen 56 of cylindrical form which is supported within a cylindrical skeletonized molded body comprising a hex head cap 60, ribs 63, and skirt 66. In general, the supporting structure is molded to the screen to form a unit which can be inserted in pipes or chambers wherever required and in this instance the cap is provided with a threaded skirt 70 and a hex head 73. The upper end of tower 35 will be understood to have secured therein a complementary thread in bushing 74 so that the filter member can be screwed tightly into place preferably with a sealing O-ring 75 as shown in FIG. 1.

The air dome 52 comprises a concentric tubular sleeve or collar 76 which may be plastic and which is closed at one end by being sealed in a rabbeted bore of cap 60. Assembly may be by any known means or the collar 76 may be molded integrally with the cap. In any event, it will be apparent that a concentric arrangement of a filter screen and an air dome is readily and simply provided and such assembly, as a cartridge, can be placed and fastened within the pump tower 35 so that the lower skirt 66 of the filter member impinges on a sealing O-ring 80 carried peripherally at the base of flow guide coupling 43. It will be apparent that due to the necking down of the coupling 43 an annular chamber 86 is effected to trap sediment falling down from the interior surface of the filter screen 56.

From the above description it will be apparent that the entire cartridge may be readily removed and replaced or it may be cleansed so as to be reuseable, depending upon the type of screen material used and the actual cost of replacement as against the cost of cleansing.

Referring now to FIGS. 4 and 5, a somewhat different construction is provided, but it will be recognized that essentially all of the components described in connection with FIGS. 1–3 are present in FIG. 4. Accordingly, components which are obviously present will not be again described in detail.

Thus, in FIGS. 4 and 5 the tower 90 although otherwise cylindrical has a flattened area 93 to which the outlet fitting 96 is attached. The tower is attached at its base to the fuel section 98 with the outlet valve 101 of conventional construction inserted and secured, all in a known manner. The skirt 104 of the cartridge is provided directly with an O-ring 107 in a molded groove so as to center and seal within the tower. Secured to the skirt is a flow guide member 110 which may be molded as a separate member and cemented or otherwise secured at its base flange 113 to the lowermost edge of the skirt. The passage 116 is of lesser diameter than the flange 113 in order to provide a sediment trap 120.

In FIG. 4 the arrows show the directional flow through the tower from the fuel chamber, the upper portion 123 of which is shown. It will be noted that flow passes the outlet valve 101 and thence through the coupling 110 and thence from the inside to the outside of the filter screen 126 circulating therearound to the outlet fitting 96. The fuel rises sufficiently within the air dome sleeve 130 closed and carried by the cap 97 as shown to compress air for smoothing pulsations in a well known manner.

The flow and air dome actions are, of course, the same for the construction described in connection with FIGS. 1–3 and the insertion and removability essentially the same except that the O-ring 107 is a part of the cartridge assembly and is inserted and removed with the cartridge.

Figure 8:
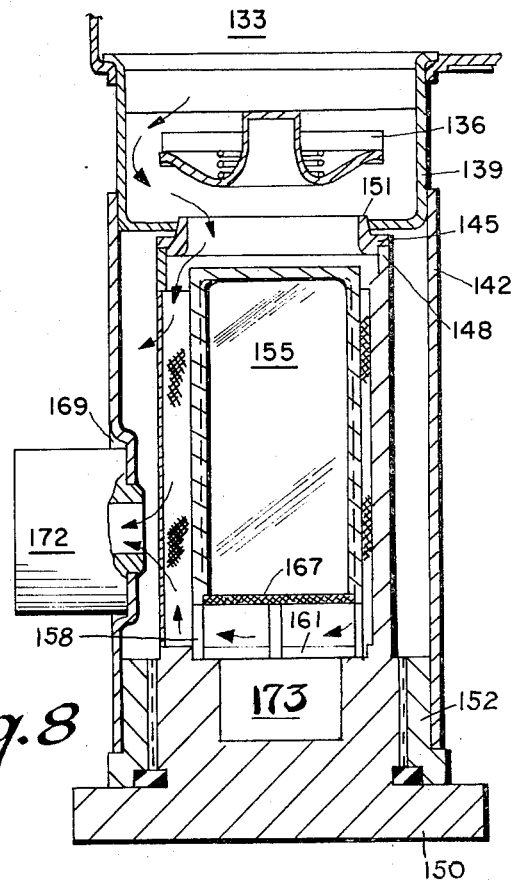
FIG. 8 is a cross section in elevation of another form of outlet tower for a pump to be reversely mounted as compared with FIG. 4.

Referring now to the form of the invention shown in FIG. 8, the modification disclosed is for a pump wherein the fuel section is lowermost and the protion 133 of the fuel section has flow directed to the outlet valve 136 within the coupling member 139 to which the tower 142 is brazed or welded. Filter member 148 has cap 150 threaded into a threaded bushing 152 secured at the open end of the tower, similar to FIG. 1.

In this instance, the filter and air dome cartridge although essentially the same insofar as the filter member is concerned as those heretofore described must necessarily have the air dome in reverse position as, for example, compared with the assembly of FIGS. 3 and 4. The construction provides a molded ring 145 secured to the screen skirt of the filter member and preferably tapered at 151 at its exterior so as to sealingly fit within an aperture of the end of coupling 139, whereby the filter member is sealingly mounted in reverse position. Likewise, the air dome 155 is mounted in reverse position and in this case it is a cup rather than an open sleeve, the top of the cup being, of course, closed and the bottom of the cup having integrally molded and extended legs 158 cemented or otherwise secured within a dished configuration 161 of cap 150. A screen 167 is provided across the mount of the air dome, this being conventional. Legs 158 may be provided in any suitable plurality as an integral molding of the air dome cup spaced sufficiently apart so as to permit free flow of fuel therebetween, as indicated by the arrows, in order to partially fill the air dome so as to have it serve its intended purpose.

In this instance, the tower may be indented as at 169 for attachment of the outlet flow fitting 172. Cap 150 is preferably provided with sediment trap 173.

Figure 9:
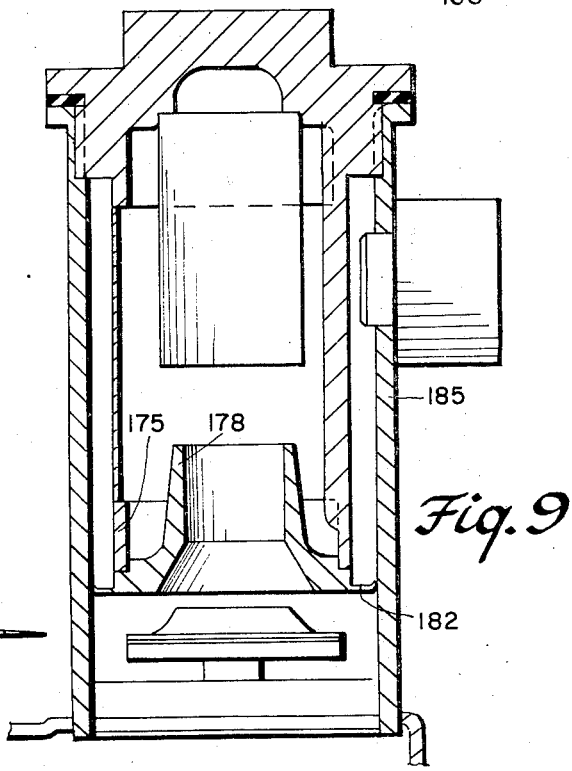
FIG. 9 is yet another modification of the invention utilizing a specially constructed unit for self-centering within an outlet tower.

Referring now to FIG. 9, a modification is shown differing from previous modifications in that the filter member skirt 175 has an outlet flow guide coupling 178 secured at the lower-most edge thereof and which coupling is a molded member having a tapered flexible flange 182 which, when the cartridge is thrust into the tower 185 can curl at its extreme periphery for centering and sealing. Thus, the material of which the member 178 is molded would be any suitable plastic that would provide for such flexibility at the tapered and thinned out flange designated by the same reference character 182 in FIG. 10 wherein flange 182 is shown in its initial condition before being thrust into the tower causing the curling of the periphery as shown in FIG. 9.

Figure 10:
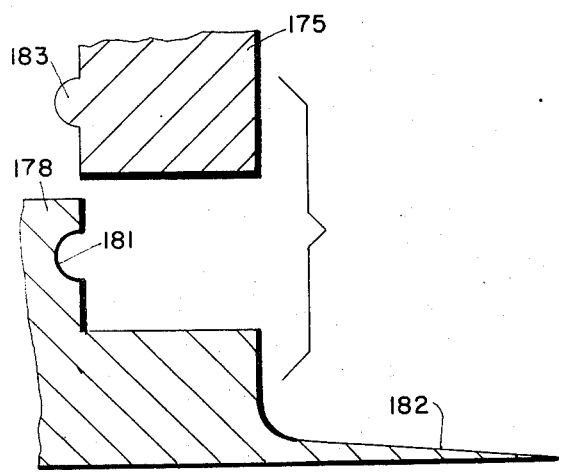
FIG. 10 is a magnified view of a portion of FIG. 9 showing the mode of locking certain of the plastic molded components.

Also, in FIG. 10 is shown a mode of securing the flow guide member 178 to the skirt 175 of the filter member by providing a peripheral groove 181 around the base of member 178 into which can lock a complimentary peripheral rib 183 provided on the internal surface of skirt 175. It will be understood that the components discussed are of sufficiently flexible plastic material to provide for the interlocking effect.

It will be noted that in all forms of the invention the air dome extends at least half the length of the filter screen in order to ensure entry of fuel into the dome for trapping and compressing air. Further, except for FIG. 8, all forms of the invention show a tubular flow guide member providing a passageway concentric with the open end of the air dome and terminating closely enough thereto so as to ensure direct linear flow from the outlet valve into the air dome in order to hasten the time of proper pressure buildup in the air dome. The actual spacing is not critical. Thus in practical pumps such spacing could be a half inch to an inch and a half depending in the size of the pump.

In addition, the outlet flow fitting in all modifications is at the side of the tower. Thus, the filter and air dome cartridge is removable as a unit. However, the fitting is a permanent part of the pump and not discarded with the cartridge, an important saving. Further, where the cartridge is to be cleansed and reused the relatively open end construction expedites the task, making flushing easier and more thorough.

Finally, all air domes may be provided with screens such as screen 167 of FIG. 8, this being conventional practice.

What is claimed is:

1. In a fuel pump, a pump body having an elongated tubular tower comprising a wall having one end attached to said pump body and extending therefrom; a tubular, elongated open ended filter member having a closure cap and extending into said tower from the other end thereof and being encompassed by said wall and said cap having means sealingly and fully closing said other end of said tower; a flow spacing between said filter member and the encompassing wall of said tower and a flow fitting through said wall; a valve disposed at said one end of said tower communicating with the open end of said filter member and communicating with said fitting; an air dome in said filter member having an end integrally secured to and carried by said cap and having an open end exposed to flow in said filter member; whereby said filter member and air dome are an integral unit removable from said tower upon removal of said cap, and whereby flow can take place between said valve and said fitting through said filter member, and fuel within said filter member effects air pressure rise in said air dome.

2. In a fuel pump as set forth in claim 1, said open end of said filter member being spaced from the wall of said tower and comprising a sealing means engaging said wall; a flow guide collar extending interiorly of said filter member at said open end to conduct fuel flow from said valve; said filter member comprising a screen terminating in a support skirt spacedly surrounding said flow guide collar, said support skirt and said guide collar comprising a sediment trap.

3. In a fuel pump as set forth in claim 1, said open end of said filter member having peripheral spacing means for spacing said open end from the wall of said tower and said spacing means having a sealing means engaging said wall; a flow guide collar extending interiorly of said filter member at said end to conduct fuel flow; said filter member comprising a screen terminating in a support skirt spacedly surrounding said flow guide collar to comprise a sediment trap; said sealing means being an O-ring around said skirt and engaging said wall.

4. In a fuel pump as set forth in claim 1, said open end of said filter member having peripheral spacing means for spacing said open end from the wall of said tower and said spacing means having a sealing means engaging said wall; a flow guide collar extending interiorly of said filter member at said end to conduct fuel flow; said filter member comprising a screen terminating in a support skirt spacedly surrounding said flow guide collar to comprise a sediment trap; said sealing means being a flexible peripheral flange of said flow guide collar and being flexed against said wall.

5. In a fuel pump as set forth in claim 1, and sealing means for sealing said filter member in said tower adjacent said open end of said filter member.

6. In a fuel pump as set forth in claim 1, a flow guide collar at said one end of said tower extending into said filter member; a sealing ring between said filter member and said flow guide collar and engaging the internal wall of said tower to seal the open end of said filter member therein; said filter member having a skirt at said open end and said flow guide collar having an annular flange, with said sealing ring disposed therebetween; and a spacing between said skirt and flow guide collar to effect a sediment trap.

7. In a fuel pump as set forth in claim 1, said air dome comprising a cup having spaced legs extending from the open end thereof and secured to said cap whereby said open end is spaced from said cap for exposure to flow in said filter member.

8. In a fuel pump as set forth in claim 1, said valve being an outlet valve.

9. In a fuel pump as set forth in claim 1, and sealing means for sealing said filter member in said tower adjacent said open end of said filter member, said sealing means being a flexible flange surrounding said filter member and being peripherally curled within said tower.

10. In a fuel pump as set forth on claim 1, and sealing means for sealing said filter member in said tower adjacent said open end of said filter member, said sealing means being a flexible flange surrounding said filter member and being peripherally curled within said tower, a flow guide collar secured at the open end of and extending into said filter member and said flange being integral with said flow guide collar.

11. In a fuel pump as set forth in claim 1, and sealing means for sealing said filter member in said tower adjacent said open end of said filter member, said sealing means being a flexible flange surrounding said filter member and being peripherally curled within said tower, a flow guide collar secured at the open end of and extending into said filter member and said flange being integral with said flow guide collar, means for securing said flow guide collar to said filter member comprising a peripheral groove exteriorly on said collar and a peripheral rib interiorly in said filter member and being flexibly disposed in said groove.

* * * * *